United States Patent
Ohnishi et al.

(10) Patent No.: US 9,547,884 B1
(45) Date of Patent: Jan. 17, 2017

(54) IMAGE REGISTRATION USING A MODIFIED LOG POLAR TRANSFORMATION

(71) Applicant: INFORMATION SYSTEMS LABORATORIES, INC., San Diego, CA (US)

(72) Inventors: Katsumi Ohnishi, Centreville, VA (US); David R. Kirk, Springfield, VA (US); Paul Matthew Techau, Catonsville, MD (US)

(73) Assignee: Information Systems Laboratories, Inc., San Diego, CA (US)

( * ) Notice: Subject to any disclaimer, the term of this patent is extended or adjusted under 35 U.S.C. 154(b) by 0 days.

(21) Appl. No.: 14/956,090

(22) Filed: Dec. 1, 2015

(51) Int. Cl.
G06K 9/32 (2006.01)
G06T 3/00 (2006.01)
G06T 7/00 (2006.01)

(52) U.S. Cl.
CPC .......... G06T 3/0075 (2013.01); G06T 7/0026 (2013.01); G06T 2200/28 (2013.01); G06T 2207/20016 (2013.01)

(58) Field of Classification Search
CPC .... G06T 7/0028; G06T 7/0026; G06T 7/0024; G06T 7/0034; G06K 9/32
See application file for complete search history.

(56) References Cited

U.S. PATENT DOCUMENTS

| | | | | |
|---|---|---|---|---|
| 7,460,730 B2* | 12/2008 | Pal | ................... | G06F 17/30843 382/276 |
| 7,912,259 B2* | 3/2011 | Arditi | ................... | G06T 7/0034 382/128 |
| 7,970,239 B2* | 6/2011 | Quan | ................... | G06K 9/40 382/154 |
| 8,090,218 B2* | 1/2012 | Larkin | ................... | G06K 9/6203 358/450 |
| 8,208,756 B2* | 6/2012 | Pham | ................... | G06K 9/6203 382/280 |
| 8,223,143 B2* | 7/2012 | Dastmalchi | ........... | A61B 3/102 345/418 |
| 8,711,245 B2* | 4/2014 | Kinrot | ................... | H04N 5/2357 348/226.1 |
| 9,483,866 B2* | 11/2016 | Stetson | ................... | G06T 15/08 |
| 2008/0049994 A1* | 2/2008 | Rognin | ................... | G06T 7/0034 382/128 |
| 2012/0092503 A1* | 4/2012 | Cheng | ................... | G06K 9/0063 348/159 |

* cited by examiner

Primary Examiner — Amir Alavi
(74) Attorney, Agent, or Firm — Nydegger & Associates

(57) ABSTRACT

A system and method for registering a test image with a reference image requires decimation of both images to create corresponding image pyramids. A Log-Polar Transformation (LPT) is then applied to corresponding pixels from the same highest levels of the respective pyramids. Next, these pixels are manipulated to establish a Normalized Correlation Coefficient (NCC) for their respective correlations. Approximately the highest 10% of correlated pixels are then retained to identify related pixels in the next lower level of their respective pyramids. Again, LPT is applied to these related pixels and they, in turn, are manipulated to establish NCC correlations for identifying pixels to be retained. This process is successively accomplished for each lower level of the pyramid until the lowest levels (i.e. the test image and the reference image) are correlated and used for registration of the test image.

20 Claims, 3 Drawing Sheets

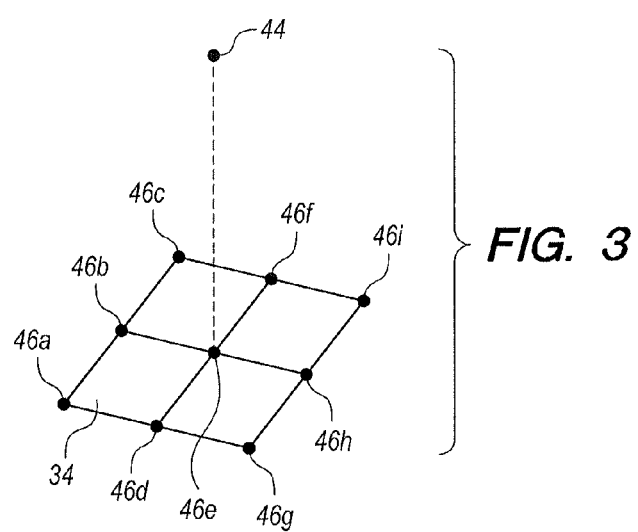
FIG. 3
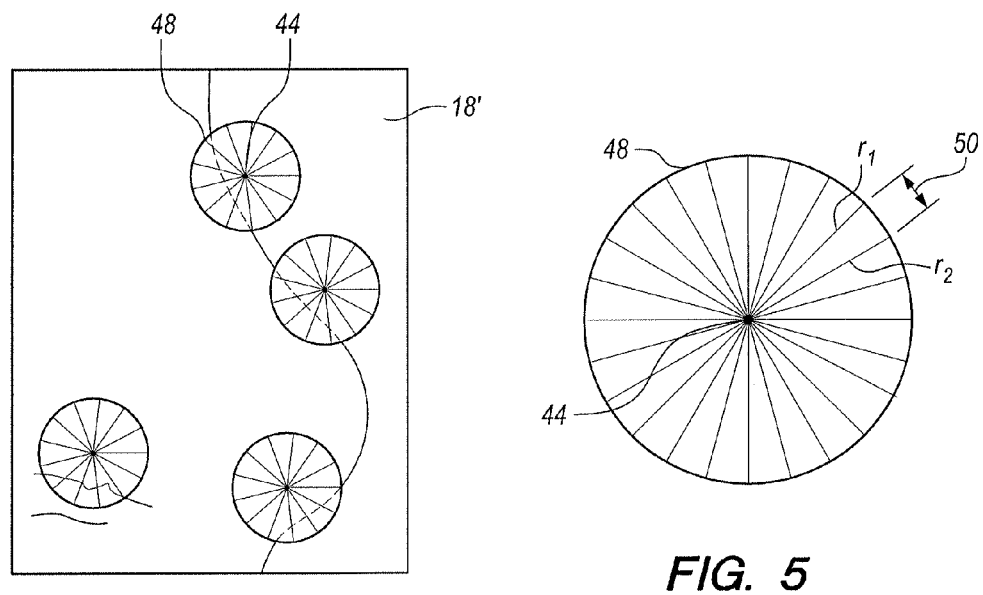
FIG. 4
FIG. 5

IMAGE REGISTRATION USING A MODIFIED LOG POLAR TRANSFORMATION

The U.S. Government has a paid-up license in this invention and the right in limited circumstances to require the patent owner to license others on reasonable terms as provided for by the terms of Contract No. N68335-06-C-007 awarded by Navy Small Business Innovation Research Program.

FIELD OF THE INVENTION

The present invention pertains generally to systems and methods for registering one image with another image. More particularly, the present invention pertains to systems and methods that register a low-fidelity test image with a high-fidelity reference image that has been archived in a database. The present invention is particularly, but not exclusively useful as a system and method for correlating decimated test images with correspondingly decimated reference images to obtain metric information from the reference image for use with the test image.

BACKGROUND OF THE INVENTION

Whenever an image is made of something (anything), it is always presented from a particular unique perspective. Furthermore, the image will most likely have no inherently useable scale and, depending on the resolving power of whatever device is used to make the image, details in the image may be minimal. On this point, it is noted that the more pixels there are in an image, the higher will be the resolution and fidelity of the image. Issues arise, however, when an image (i.e. a photo) is to be used to identify the location of an object (target) in the image. In particular, issues of perspective, scale and resolution can be troublesome when the image has been created by a relatively low-fidelity camera (i.e. a photo image), and is taken from an unspecified location (e.g. from an aerial vehicle). Moreover, as suggested above, these issues may become crucial when the intended use of the image is for locating something in the image (e.g. a geo-location task).

In order for a photo image to be useful for geo-location purposes, the photo first needs to be somehow registered. In this case, registration is necessary so the perspective of the image can be defined and a metric scale for use with the image can be established. This can be done in any of several different ways. For example, the Log-Polar Transformation (LPT) is a well known technique that correlates selected features from different images (i.e. a "test" image and a "reference" image). Specifically, this is done to register the test image with the reference image (see A. D. Ventura and A. Rampini, "Image registration by recognition of corresponding structures," IEEE Trans. on Geoscience and Remote Sensing, May 1990, pp. 305-314). With LPT, as with other techniques, however, the resolution level of the image (i.e. number of pixels in the image) can become a significant issue when near real time registration of the image is required. An important reason for this is that the more pixels there are in an image (i.e. the higher the fidelity of the image) the larger will be the computational load, and the longer will be the processing time. This will be so, even for relatively low-fidelity, low-resolution images.

In light of the above, it is an object of the present invention to provide a system and method for registering a low-fidelity test image with a high-fidelity reference image, in near real time, wherein the computational load and processing time for registration is minimized. Another object of the present invention is to provide a system and method for registering a test image with a reference image wherein pixels from different images are respectively decimated and correspondingly correlated for subsequent selection and further evaluation in an image registration process. Still another object of the present invention is to provide a system and method for registering a low-fidelity test image with a high-fidelity reference image that is relatively simple to manufacture, is easy to use and is comparatively cost effective.

SUMMARY OF THE INVENTION

In accordance with the present invention, geo-location and metric information of a geographical area are determined by first obtaining an actual test image of the geographical area. The test image is then compared with an archived reference image covering the same area. When a comparison confirms that the test image corresponds to the reference image, the present invention proceeds to orient and scale (i.e. register) the test image with the reference image. With this registration, known metrics from the reference image can be used to establish geo-locations and perform measurements on the test image of the geographical area.

Typically, a test image of a geographical area will be obtained using a video sensor that is mounted onboard an Unmanned Aerial Vehicle (UAV). For purposes of the present invention, this test image can have relatively low-fidelity resolution and, thus, will preferably include a matrix of M×N pixels that is near the size frequently used for standard encoding (e.g. 460×350 pixels). In any event, once the test image has been obtained, a homograph reference image is retrieved from a geo-registered database, such as Digital Point Precision Database (DPPDB), U.S. Geological Survey (USGS) digital ortho-quads and Controlled Image Base (CIB). The test image is then confirmed for registration with the reference image in accordance with the methodology of the present invention.

An important aspect of the image registration process for the present invention involves decimating both the test image and the reference image. Specifically, this decimation is done in accordance with a predetermined decimation ratio that is used for both of the images (e.g. a decimation ratio of 2). To begin this decimation, at least one base pixel, but preferably four or more, is selected in the original test image. While retaining the base pixel(s) during decimation, the test image is then sequentially decimated to create an image pyramid wherein each next higher level of the pyramid has an image of lower resolution. Thus, the lowest level pyramid image has the most pixels and the highest fidelity (resolution). It also has all of the content of the original test image. Progressively higher levels of pyramid images have fewer pixels with correspondingly lower fidelity (resolution). Typically, an image pyramid having six or seven levels of pyramid images is sufficient for the purposes of the present invention. Likewise, the reference image is decimated to create an image pyramid having a same number of levels, with respectively corresponding reference pyramid images.

Once the image pyramids have been created for both the test image and the reference image, a Log Polar Transformation (LPT) is applied to corresponding pixels at corresponding pyramid image levels. In this process, the methodology of the present invention starts with LPT applications on selected pixels (e.g. base pixels) at the highest pyramid image level (i.e. on the image having the lowest resolution with fewest pixels). Subsequently, LPT is sequentially applied to pixels at lower pyramid image levels until the lowest pyramid image level is reached. In this process, however, LPT is not applied to all pixels at each next lower level. Instead, LPT is applied only to pixels that are related to pixels that have been selectively retained at the immediately higher level. As described in greater detail below, this retention of pixels at the higher level depends on the correlation of pixels from the reference image pyramid with corresponding pixels from the test image pyramid. Stated differently, based on a correlation between corresponding pixels at the same levels (i.e. image pyramid and reference pyramid) only certain pixels (e.g. 10%) are retained from those evaluated by LPT. These retained pixels then determine which pixels are related to them at the next lower level, and only the related pixels are then subsequently evaluated by LPT.

As used for the present invention, LPT is a mathematical manipulation wherein an "image patch" (i.e. an area of a sub-image) is defined by angle-distance coordinates. To create an image patch, an image point (i.e. pixel) is selected on a pyramid image. This image point (pixel) then becomes the center of a circle for the image patch and a radius length for the circle is established. For example, a 35 pixel radius can be used at the lowest pyramid level. Thereafter, according to the decimation ratio that is being used to create the image pyramid, radii lengths having fewer pixels are successively established for image patches in each higher level of the image pyramid. After each image patch has been located, different radii of the circle are identified at predetermined angle intervals (e.g. 1° intervals) around the circle. For application of the LPT, a log scale is then applied along each of the radii. This is done so that the image content for samples taken from the test image will be the same as the image content for samples taken from the reference image. During this sampling a Normalized Correlation Coefficient (NCC) is computed for corresponding pairs of individual pixels. Specifically, each pixel in an image patch of the test image is correlated with a corresponding pixel of a corresponding image patch of the reference image. With the present invention, the NCC for a pixel pair is computed according to the expression:

$$\rho_{12} = \frac{\sum_{k=1}^{N}\sum_{j=1}^{M}(I_1(x_k,y_j)-\mu_1)(I_2(x_k,y_j)-\mu_2)}{\sqrt{\sum_{k=1}^{N}\sum_{j=1}^{M}(I_1(x_k,y_j)-\mu_1)^2}\sqrt{\sum_{k=1}^{N}\sum_{j=1}^{M}(I_2(x_k,y_j)-\mu_1)^2}}$$

where $I_1(x_k,y_j)$ and $I_2(x_k,y_j)$ denote the intensity of a test image ($I_1$) and of a reference image ($I_2$), respectively, at the k, $j^{th}$ pixel ($x_k,y_j$), and further where $\mu_1$ and $\mu_2$ in the expression below denote the sample means computed as:

$$\mu_i = \frac{1}{NM}\sum_{k=1}^{N}\sum_{j=1}^{M}I_i(x_k,y_j); i = 1, 2.$$

Recall, LPT is applied to pixels of the test image and to corresponding pixels of the reference image at each pyramid level (beginning at the highest level). Using computations from the above expressions, pixels in the reference image having the highest correlation with pixels in the test image (e.g. highest 10%) are retained. Pixels in the next lower pyramid levels of the sensor image pyramid and the reference image pyramid that relate to the retained pixels from the adjacent higher level are then used for the next iteration of LPT application.

As a consequence of the above-described sequence, a final iteration of LPT will be applied on the test image and on the reference image (i.e. respective LPT applications on the lowest pyramid levels). The test image can then be registered with the reference image and known dimensions from the geo-registered database (i.e. reference image) can be used to measure the test image. This registration then establishes geo-locations and obtains metric information for use with the test image of the geographic area.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which:

FIG. 3 is a schematic representation of the relationship between a retained pixel from an upper level of an image pyramid, and its related pixels in the next lower level of the image pyramid;

FIG. 4 is a view of a test (or reference) image with superposed image patches;

FIG. 5 is an exemplary geometric structure for an individual image patch; and

DESCRIPTION OF THE PREFERRED EMBODIMENTS

Figure 1:
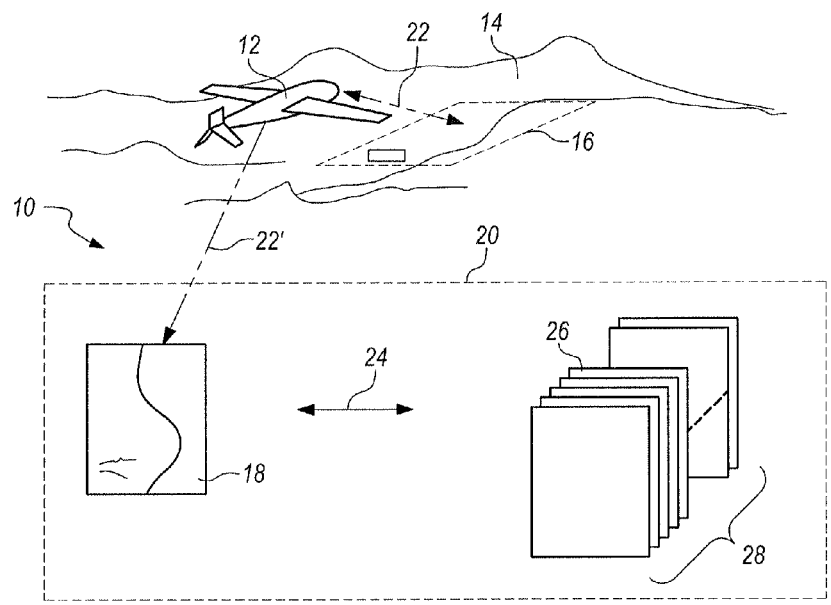
FIG. 1 is a perspective view of the system of the present invention interacting with a geographical area of an exemplary environment.

Referring initially to FIG. 1 a system in accordance with the present invention is shown and is generally designated 10. As shown, the system 10 includes a vehicle (i.e. structure), such as the Unmanned Aerial Vehicle (UAV) 12 that supports an image sensor (not shown). Preferably, the image sensor is any type of camera that is capable of producing images (i.e. pictures) of a particular target. Importantly, it need not create high-fidelity images.

For purposes of this disclosure, the UAV 12 with its video sensor is shown flying over terrain 14 that includes a geographical area 16. More specifically, the UAV 12 is shown taking a test image 18 of the geographical area 16. As indicated in FIG. 1, the test image 18 is transferred via the UAV 12 to a computer 20. This transfer is represented in FIG. 1 by the arrows 22 and 22'. For the present invention, the computer 20 will most likely be located at a ground installation (not shown) that is in wireless communication with the UAV 12.

It is also indicated in FIG. 1 that the computer 20 will perform a homograph selection (indicated by the arrow 24) of a reference image 26. This selection, taken from an archives 28, will be made so that the reference image 26 corresponds with the test image 18. Importantly, the archives 28 can be any type of reference database that contains a plurality of reference images 26 that each has metric information useable with the test image 18. Preferably, but particularly for geo-location purposes, the archives 28 will include a geo-referenced database such as the databases presented in Digital Point Precision Database (DPPDB), U.S. Geological Survey (USGS) digital ortho-quads or Controlled Image Base (CIB). Further, as will be appreciated by the skilled artisan, the archives 28 will most likely not be part of the computer 20. Rather, the archives 28 will be accessible by the computer 20. In any event, the reference image 26 needs to be a homograph of the test image 18. Stated differently, though the reference image 26 and the test image 18 may be of different scale, and though they may present different perspectives of a same subject matter (e.g. geographical area 16), they both have all the same corresponding similarities of the subject matter (e.g. geographical area 16).

Figure 2A:
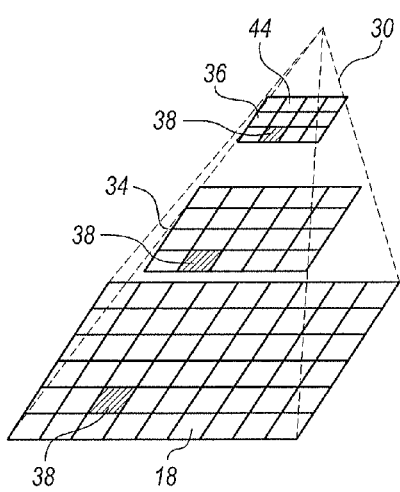
FIG. 2A is an image pyramid for a test image of the geographical area.
Figure 2B:
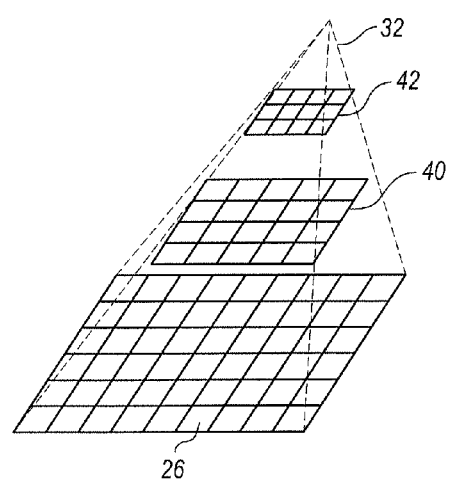
FIG. 2B is an image pyramid for a reference image of the geographical area retrieved from an archives of a geo-referenced database.

FIG. 2A shows an image pyramid 30 and FIG. 2B shows an image pyramid 32 that have been respectively created from the test image 18 and from a reference image 26. In detail, to create the image pyramid 30, a decimation ratio is chosen. For example, as generally shown in FIG. 2A, a decimation ratio of 2 (i.e. 2:1) is typical. In this case, for a test image 18 having M pixels per row and N pixel per column (i.e. an N×M matrix), a first application of a decimation ratio of 2 will result in a second level pyramid image 34 having M/2 pixels per row and N/2 pixels per column. Thus, the second level 34 has one quarter the pixels of the base level (e.g. the test image 18) and will, accordingly have lower resolution fidelity. Applying the decimation ratio a second time results in a third level 36 for the image pyramid 30. For this third level 36 there are now M/4 pixels per row and N/4 pixels per column. This process can be continued. Although, only a second level 34 and a third level 36 are shown in FIG. 2A for the image pyramid 30, it will be appreciated by the skilled artisan that additional levels can be similarly created. Indeed, for the present invention, the image pyramid 30 for test image 18 will preferably have seven or eight different image levels.

As the different levels of the image pyramid 30 are being created by a decimation as described above, some selected pixels should not be discarded. Instead, it is preferable that at least one, but preferably a plurality of base pixels 38 be retained at each level of the pyramid 30. Stated differently, each level of the image pyramid 30 should include a base pixel 38.

By cross referencing FIG. 2A with FIG. 2B it will be appreciated that the image pyramid 32 for reference image 26 is created in the substantially the same manner as described above for the image pyramid 30. In particular, the same decimation ratio is used, and the same number of image levels are created. Thus, it will be appreciated that a second image level 40 for the image pyramid 32 corresponds to the second image level 34 of image pyramid 30. Likewise, the third image level 42 of the image pyramid 32 corresponds to the second image level 36 of the image pyramid 30. Further, for disclosure purposes, within each pyramid (30 or 32) an image level (e.g. image level 36 of image pyramid 30) having fewer pixels than an adjacent level (e.g. image level 34) is often referred to herein as the "higher" level (vis-a-vis the "lower" level having more pixels). Thus, second image level 34 is a "higher image level" than is the base level (i.e. test image 18) of the image pyramid 30.

As required for the present invention, creation of the image pyramids 30 and 32 is followed by a subsequent reconstruction process. Specifically, once the image pyramids 30 and 32 have been created, at least one pixel (preferably more) is selected from the highest image level (e.g. image level 36 of the image pyramid 30 shown in FIG. 2A). For example, consider the pixel 44 in third image level 36 of the image pyramid 30. As illustrated in FIG. 3, the pixel 44 in the third image level 36 relates to nine different pixels 46a-i in the next lower image level (i.e. in the second image level 34). Similarly, each of these related pixels 46a-i will have nine related pixels on the next lower image level (i.e. the base level test image 18 in image pyramid 30). As disclosed below, however, for the present invention it will most likely happen that not all of the pixels 46a-i that are related to a retained pixel 44 from a higher level will, in turn, be retained for identification of related pixels in its next lower level.

Turning now to FIG. 4, consider the test image 18' to be the decimated image on the highest level (e.g. third level 36) of the image pyramid 30. A plurality of image patches, of which the image patch 48 is exemplary, is selected for evaluation. Specifically, the image patch 48 that will be considered here for this disclosure, is centered on the pixel 44. Importantly, a corresponding image patch 48' (not shown) on the third level 42 of the image pyramid 32 for the reference image 26 is similarly selected for evaluation. Specifically, the evaluation of these image patches 48 and 48' is accomplished by the application of a Log Polar Transformation (LPT) and their manipulation with a Normalized Correlation Coefficient (NCC).

As envisioned for the present invention, LPT is applied to each pixel in an image patch (e.g. image patch 48). Specifically, as best seen in FIG. 5, the image patch 48 is centered on a pixel (e.g. pixel 44), and a plurality of radii "r" is defined for the patch 48. Specifically, the radii can be defined by a number of pixels that is determined by the decimation ratio. For instance, if a radius "r" is defined as thirty-six pixels in the test image 18, it will be eighteen pixels at the second level 34, nine pixels at the third level 36 and so on. Further, the image patch 48 will have a plurality of radii "r" that are spaced apart from each other by an interval 50. Preferably, the interval 50 will be approximately one degree (1°). Once the image patch 48 has be so defined, a log transformation is applied to pixels along each radius in a manner well known in the pertinent art.

As the LPT is being applied, each selected pixel from corresponding levels of the image pyramids 30 and 32 are compared using the NCC. This comparison is performed using the expression:

$$\rho_{12} = \frac{\sum_{k=1}^{N}\sum_{j=1}^{M}(I_1(x_k, y_j) - \mu_1)(I_2(x_k, y_j) - \mu_2)}{\sqrt{\sum_{k=1}^{N}\sum_{j=1}^{M}(I_1(x_k, y_j) - \mu_1)^2} \sqrt{\sum_{k=1}^{N}\sum_{j=1}^{M}(I_2(x_k, y_j) - \mu_1)^2}}$$

where $I_1(x_k, y_j)$ and $I_2(x_k, y_j)$ denote the intensity of a test image ($I_1$) and a reference image ($I_2$), respectively, at the k, $j^{th}$ pixel ($x_k, y_j$), and $\mu_1$ and $\mu_2$ denote the sample means computed as:

$$\mu_i = \frac{1}{NM}\sum_{k=1}^{N}\sum_{j=1}^{M} I_i(x_k, y_j); i = 1, 2.$$

After the NCC has been performed, the pixel pairs having the highest value NCC (e.g. 10%) are selected for retention and identification of related pixels in the next lower level. Specifically, the related pixels at the next lower level are identified as disclosed above with reference to FIG. 4. This continues until the pixels on the base level of the respective image pyramids (i.e. test image 18 and reference image 26) are evaluated.

Figure 6:
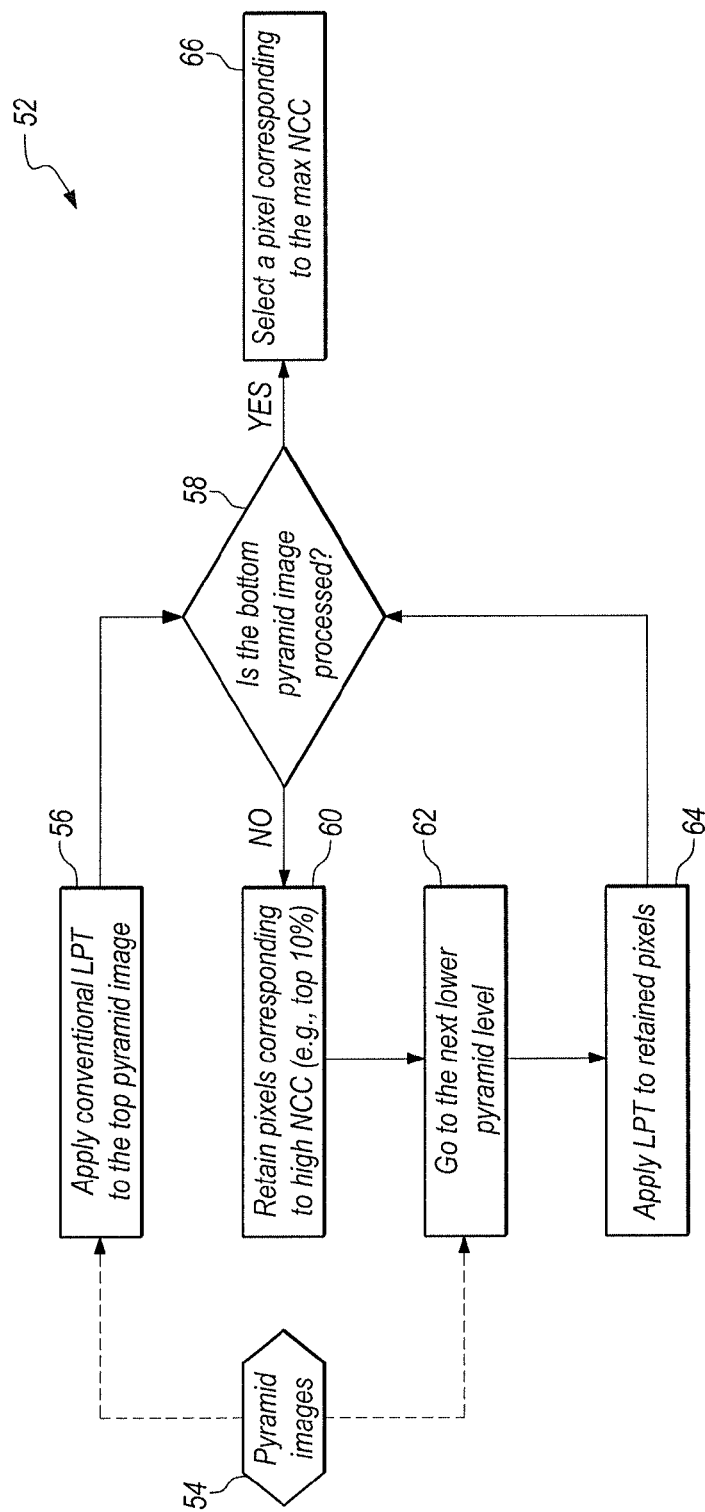
FIG. 6 is an operational block diagram of the steps involved for implementing the present invention.

Referring now to FIG. 6, a block diagram representation of the operation of the present invention is shown and is generally designated 52. It is to be appreciated that the diagram 52 considers that a test image 18 and a reference image 26 have been previously decimated to respectively create a test image pyramid 30 and a reference image 32. Then, as indicated by the block 54, a conventional LPT is applied to the top pyramid image (see action block 56). If this is not the bottom pyramid image to be processed, the inquiry block 58 proceeds to action block 60 which indicates that pixels are retained according to their NCC (e.g. top 10%) and you go to the next lower pyramid level (see block 62). Again, LPT is applied to the retained pixels (block 64) and inquiry block 58 questions whether this is the bottom pyramid image to be processed. If so, a pixel with a max NCC is selected (block 66) and is used to register the test image 18 with the reference image 26.

While the particular Image Registration Using a Modified Log Polar Transformation (LPT) as herein shown and disclosed in detail is fully capable of obtaining the objects and providing the advantages herein before stated, it is to be understood that it is merely illustrative of the presently preferred embodiments of the invention and that no limitations are intended to the details of construction or design herein shown other than as described in the appended claims.

What is claimed is:

1. An image registration method which comprises the steps of:
obtaining a test image of an area;
retrieving a reference image from a database wherein the reference image includes at least a portion of the area;
decimating both the test image and the reference image using a predetermined decimation ratio;
correlating a selected pixel of the decimated test image with a selected pixel of the decimated reference image;
identifying a pixel in the test image and a pixel in the reference image, wherein the identified pixels respectively relate to the pixel selected in the correlating step; and
manipulating the identified pixels to register the test image with the reference image.

2. A method as recited in claim 1 wherein the obtaining step is accomplished using a video sensor onboard an Unmanned Aerial Vehicle (UAV).

3. A method as recited in claim 1 wherein the decimating step requires creating a first image pyramid from the test image and a second image pyramid from the reference image, wherein each image pyramid is created in accordance with the decimation ratio to establish a corresponding plurality of pyramid image levels, with higher levels of the image pyramid having fewer pixels, and further wherein each pyramid image in the first image pyramid includes a base pixel selected from the sensor image.

4. A method as recited in claim 3 wherein the correlating step comprises the steps of:
applying a Log-Polar-Transformation (LPT) to pixels in corresponding highest levels of the first and second image pyramids; and
performing a Normalized Correlation Coefficient (NCC) manipulation on pixels transformed in the applying step to obtain an NCC value for each pixel.

5. A method as recited in claim 4 wherein the performing step is accomplished using the expression:

$$\rho_{12} = \frac{\sum_{k=1}^{N} \sum_{j=1}^{M} (I_1(x_k, y_j) - \mu_1)(I_2(x_k, y_j) - \mu_2)}{\sqrt{\sum_{k=1}^{N} \sum_{j=1}^{M} (I_1(x_k, y_j) - \mu_1)^2} \sqrt{\sum_{k=1}^{N} \sum_{j=1}^{M} (I_2(x_k, y_j) - \mu_1)^2}}$$

where $I_1(x_k,y_j)$ and $I_2(x_k,y_j)$ denote the intensity of a test image ($I_1$) and a reference image ($I_2$), respectively, at the k, $j^{th}$ pixel ($x_k,y_j$), and $\mu_1$ and $\mu_2$ denote the sample means computed as:

$$\mu_i = \frac{1}{NM} \sum_{k=1}^{N} \sum_{j=1}^{M} I_i(x_k, y_j); i = 1, 2.$$

6. A method as recited in claim 4 wherein the identifying step comprises the steps of:
retaining manipulated pixels according to predetermined NCC values;
identifying related pixels in the next lower level of the first and second image pyramids, wherein each related pixel corresponds to a retained pixel from the retaining step, and wherein the related pixels now collectively constitute the highest level of the respective image pyramids; and
successively repeating the applying, performing, retaining and identifying steps, in sequence, as necessary.

7. A method as recited in claim 6 wherein the predetermined NCC values of the retaining step indicate correlations above 10%.

8. A method as recited in claim 1 wherein the predetermined decimation ratio is 2:1.

9. A method as recited in claim 1 wherein the database is a geo-registered database selected from a group consisting of Digital Point Precision Database (DPPDB), U.S. Geological Survey (USGS) digital ortho-quads and Controlled Image Base (CIB).

10. A method as recited in claim 9 further comprising the step of using the geo-registered database to determine a geo-location for the target.

11. An image registration method which comprises the steps of:
obtaining a test image of an area, wherein the test image includes a plurality of pixels;
selecting at least one base pixel on the test image;
retrieving a reference image of the area from a geo-registered data base, wherein the reference image includes a plurality of pixels;
creating a first image pyramid from the test image and a second image pyramid from the reference image, wherein each image pyramid is created in accordance with a predetermined decimation ratio to establish a corresponding plurality of pyramid image levels, with higher levels of the image pyramid having fewer pixels, and further wherein each pyramid image in the first image pyramid includes the base pixel;

applying a Log-Polar-Transformation (LPT) to pixels in corresponding highest levels of the first and second image pyramids;
performing a Normalized Correlation Coefficient (NCC) manipulation on pixels transformed in the applying step to obtain an NCC value for each pixel;
retaining manipulated pixels according to predetermined NCC values;
identifying related pixels in the next lower level of the first and second image pyramids, wherein each related pixel corresponds to a retained pixel from the retaining step, and wherein the related pixels now collectively constitute the high level of the respective image pyramids;
successively repeating the applying, performing, retaining and identifying steps, in sequence; and
using pixels having a substantially maximum NCC value in the lowest level pyramid image to register the test image with the reference image.

12. A method as recited in claim 11 wherein the predetermined decimation ratio is 2:1.

13. A method as recited in claim 11 wherein the lowest level of the first image pyramid and the lowest level of the second image pyramid are respectively the test image and the reference image.

14. A method as recited in claim 11 wherein the geo-registered data base is selected from a group consisting of Digital Point Precision Database (DPPDB), U.S. Geological Survey (USGS) digital ortho-quads and Controlled Image Base (CIB).

15. A method as recited in claim 11 wherein the applying step comprises:
identifying a pixel;
selecting a predetermined radius to define a circle around the identified pixel; and
sampling pixels in a domain on specified radii within the circle in accordance with a log scale.

16. A method as recited in claim 11 wherein the performing step is accomplished using the expression:

$$\rho_{12} = \frac{\sum_{k=1}^{N}\sum_{j=1}^{M}(I_1(x_k,y_j)-\mu_1)(I_2(x_k,y_j)-\mu_2)}{\sqrt{\sum_{k=1}^{N}\sum_{j=1}^{M}(I_1(x_k,y_j)-\mu_1)^2}\sqrt{\sum_{k=1}^{N}\sum_{j=1}^{M}(I_2(x_k,y_j)-\mu_1)^2}}$$

where $I_1(x_k,y_j)$ and $I_2(x_k,y_j)$ denote the intensity of a test image ($I_1$) and of a reference image ($I_2$), respectively, at the k, j$^{th}$ pixel ($x_k,y_j$), and $\mu_1$ and $\mu_2$ denote the sample means computed as:

$$\mu_i = \frac{1}{NM}\sum_{k=1}^{N}\sum_{j=1}^{M} I_i(x_k,y_j); i = 1, 2.$$

17. A method as recited in claim 16 wherein the predetermined NCC values of the retaining step indicate correlations above 10%.

18. A method as recited in claim 11 wherein four base pixels are selected.

19. A system for registering images which comprises:
a video sensor mounted on an Unmanned Aerial Vehicle (UAV) for obtaining a test image of an area, wherein the test image includes a plurality of pixels;
an archives for storing a reference image of the area, wherein the reference image is included in a geo-registered data base, and wherein the reference image includes a plurality of pixels;
a computer for creating a first image pyramid from the test image and a second image pyramid from the reference image, wherein each image pyramid is created in accordance with a predetermined decimation ratio to establish a corresponding plurality of pyramid image levels, with higher levels of the image pyramid having fewer pixels, and further wherein each pyramid image in the first image pyramid includes the base pixel;
a computer program for applying a Log-Polar-Transformation (LPT) to pixels in corresponding highest levels of the first and second image pyramids and performing a Normalized Correlation Coefficient (NCC) manipulation on transformed pixels to obtain an NCC value for each pixel, and for retaining manipulated pixels according to predetermined NCC values to identify related pixels in the next lower level of the first and second image pyramids, wherein the related pixels now collectively constitute the highest level of the respective image pyramids, and for successively repeating iterations of the program; and
a means for using pixels having a substantially maximum NCC value in the respective lowest level pyramid image to register the test image with the reference image.

20. A system as recited in claim 19 wherein the geo-registered data base is selected from a group consisting of Digital Point Precision Database (DPPDB), U.S. Geological Survey (USGS) digital ortho-quads and Controlled Image Base (CIB), and the decimation ratio is 2.

* * * * *